Jan. 9, 1945.  S. B. MARTIN  2,366,923
PUSHER
Filed Oct. 7, 1942  2 Sheets-Sheet 1
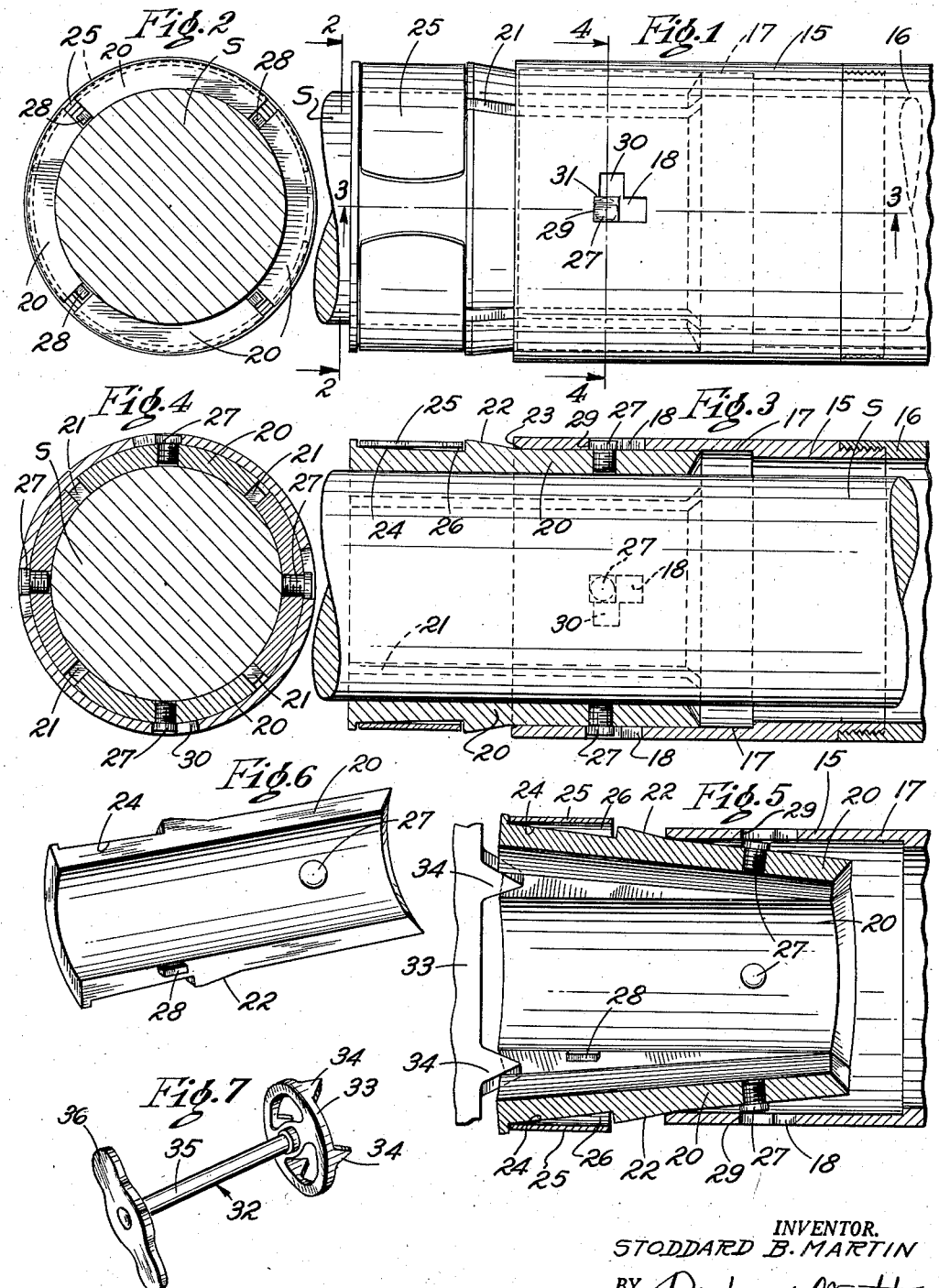
INVENTOR.
STODDARD B. MARTIN
BY Richey & Watts
ATTORNEYS Jan. 9, 1945.　　　　S. B. MARTIN　　　　2,366,923
PUSHER
Filed Oct. 7, 1942　　　　2 Sheets-Sheet 2
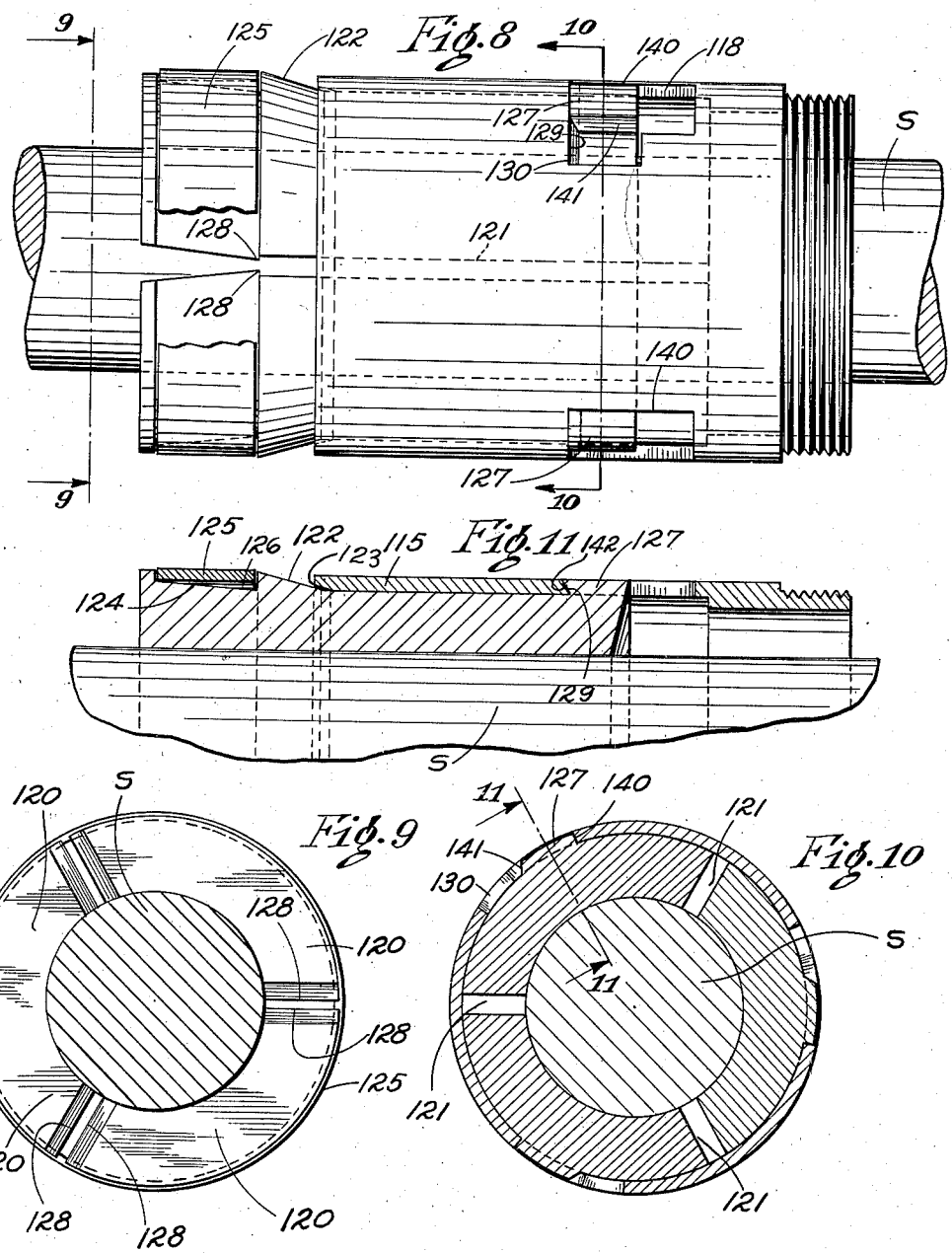
INVENTOR.
STODDARD B. MARTIN
BY Richey & Watts
ATTORNEYS Patented Jan. 9, 1945

2,366,923

UNITED STATES PATENT OFFICE 2,366,923

PUSHER

Stoddard B. Martin, Lakewood, Ohio

Application October 7, 1942, Serial No. 461,138

16 Claims. (Cl. 29—62)

This invention relates to improvements in stock feed fingers or pushers of the type employed in automatic screw machines.

Each spindle of an automatic screw machine ordinarily surrounds a rotating collet tube having a collet at its forward end which is arranged to be compressed radially to grip and rotate a bar of stock fed axially through the tube. At the end of each cycle of operation the projecting end of stock is cut off from the bar, whereupon the collet opens and a new length of stock is fed forwardly and the collet is again closed to grip the stock and repeat the cycle of operation. The stock is ordinarily fed forward by a pusher carried by a reciprocating pusher tube arranged between and coaxial with the collet tube and the bar of stock.

In the conventional machine the pusher is simply a spring bushing exerting a constant grip on the bar of stock which is moved forwardly after the collet opens until the forward end of the bar strikes a stock gauge. The collet then grips the bar and the pusher is retracted. One of the disadvantages of this arrangement is that when the pusher is given a sufficiently tight grip on the bar to insure accurate feeding and prevent rebounding when the bar strokes the gauge, there is danger of scratching or scoring the stock when the pusher is retracted. Another disadvantage of such an arrangement is that the pusher exerts a constant grip on the bar stock during both the feeding and return strokes so that the gripping surfaces of the pusher are rapidly worn out by the friction of the return strokes.

The principal objects of the present invention are to combine in a pusher for machines of this type means to effect a one way gripping action, removable pads or bushings to accommodate all different sizes of stock up to and including the maximum capacity of the machine, and means for preventing the wedging or tight gripping action of the pusher when it is desired to withdraw the bar of stock; to arrange the pusher so that the bushings may be removed or replaced without removing the pusher tube from the machine; to maintain the wedging and wedge release mechanism within the thickness of the walls of the pusher shell; to eliminate loose or readily separable parts other than the removable bushing or pad units; to maintain the wedging element of the pusher shell circumferentially continuous so as to insure a positive grip on the stock without danger of slipping; to permanently mount on the bushing abutment elements which cooperate with the shell; to maintain the abutments on the shell and bushing in cooperative relation regardless of whether or not stock is gripped within the pusher; and to improve and simplify the construction and the manner of assembling and disassembling the removable bushings in the shell. Other objects and advantages will appear from the following detailed description of the embodiments of the invention.

In the accompanying drawings:

Fig. 1 is a side elevation of a pusher constructed in accordance with this invention;

Fig. 2 is a cross section through the stock on the line 2—2 of Fig. 1 showing the front end of the pusher in elevation;

Fig. 3 is a longitudinal section through the pusher taken on the line 3—3 of Fig. 1;

Fig. 4 is a cross section taken on the line 4—4 of Fig. 1;

Fig. 5 is a longitudinal section through the pusher showing the manner of removing the bushing from the shell;

Fig. 6 is a perspective view of one of the sections or pads of the bushing;

Fig. 7 is a perspective view of a form of tool for removing the bushing from the shell;

Fig. 8 is a side elevation of a modified form of pusher;

Fig. 9 is a cross section through the stock on the line 9—9 of Fig. 8 showing the end of the pusher in elevation;

Fig. 10 is a cross section taken on the line 10—10 of Fig. 8; and

Fig. 11 is a partial longitudinal section taken on the line 11—11 of Fig. 10.

Referring to the drawings, the embodiment of the invention illustrated in Figs. 1 to 7, inclusive, includes a shell 15 which is secured in any suitable manner to the forward end of a pusher tube 16 disposed within the collet tube (not shown) of an automatic screw machine. If desired, the forward end of the shell may be counterbored inwardly from its front face, as indicated at 17, to provide a seat for the bushing. L-shaped cut-outs 18 are cut through the wall of the shell. One such cut-out is provided for each section of the bushing, there being four cut-outs 18 equally spaced about the shell in the embodiment illustrated.

The bushing is made up of four segments or pads 20 separated from each other by slots 21. The rearward portion of the bushing, designed to fit within the counterbore 17 of the shell, has a cylindrical outer surface which fits freely within the shell when the bushing is expanded to grip stock of the maximum size intended to be handled by the particular bushing.

In front of the cylindrical portion the bushing is formed with an outwardly tapered wedging surface 22 adapted to cooperate with the front edge 23 of the shell. In advance of the tapered surface 22 the bushing is provided with a groove 24 to receive a spring band 25. Either the bottom of the groove 24 or the under surface of the spring 25 is tapered so that the initial engagement of the spring upon the bushing is at the forward edge of the spring, leaving a slight space 26 between the groove and the rear edge of the spring when the bushing is expanded and is gripping stock as illustrated in Fig. 3. If desired, both the groove and the spring may be tapered to form the space 26.

Each of the segments or pads 20 is provided with a stud 27 projecting from the outer surface thereof through a distance about equal to the thickness of the wall of the shell 15 and adapted to fit in one of the cut-outs 18. Preferably the studs 27 are square in outline as shown. The studs are permanently secured to the pads in any convenient manner as by threaded shanks screwed into tapped openings in the pads. Preferably the studs are screwed into place with two of their edges parallel with the axis of the bushing and are then welded. Manifestly the studs may be fixed to the pads in any other desired manner, as by simply welding to the outer surfaces.

The slots 21 separating the pads from each other are of greater width than needed to provide the desired expansion of the bushing to grip the stock. At a point spaced rearwardly from the forward edge of the spring 24 and in advance of the studs 27 the adjacent edges of the pads are provided with fulcrum abutments. In the illustrated embodiment this is accomplished by welding a lug 28 to one edge of each of the pads 20. Each lug 28 is then in position to engage the straight edge of the adjacent pad but is spaced a short distance therefrom when stock is gripped within the bushing, as illustrated in Fig. 2.

Each of the cut-outs 18 formed in the shell is designed to receive one of the lugs 27 and is formed with a greater axial length than the axial length of its lug 27 so as to permit relative axial movement between the shell and the bushing. Each cut-out has a rearwardly facing edge 29 arranged to engage the forward edge of the lug 27 to pull the bushing over the stock on the retracting stroke of the pusher tube. Each cut-out also has a laterally disposed notch 30 spaced rearwardly a short distance from the edge 29, leaving a shoulder 31. Each notch 30 is arranged to receive a lug 27 to limit relative axial movement of the bushing and shell when desired.

When the bushing is assembled and before it is inserted in the shell the tension of the spring 25 presses the segments 20 toward each other until the fulcrum abutments 28 engage the edges of the adjacent pads. The tension exerted by the front edge of the spring, which is in front of the abutments 28, rocks the front ends of the pads toward each other about the fulcrum abutments 28 until the space 26 at the rear end of the spring 25 is closed. This partially closes the front ends of the slots 21 and opens the rear ends slightly.

To assemble the bushing in the shell the rear ends of the segments 20 are collapsed together until the lugs 27 can enter the front end of the shell and the bushing is then forced rearwardly until the lugs snap into the cut-outs 18. To remove the bushing the front ends of the slots 21 are spread, forcing the spring 25 open and fulcruming the segments about the front edge 23 of the shell until the lugs 27 are forced inwardly far enough to clear the wall of the shell, after which the bushing can be withdrawn forwardly.

For conveniently effecting such removal I provide a tool 32 consisting of a ring 33 carrying four wedge lugs 34 and mounted on a rod 35 terminating in a handle 36. The rod 35 is preferably made of sufficient length to permit the tool to be inserted through the collet of the machine to engage the bushing without disturbing the assembly of the pusher tube within the collet tube of the machine. The wedge lugs 34 are spaced so that one enters each of the slots 21, and are designed to spread the slots the necessary amount by driving or pushing the tool inwardly, as illustrated in Fig. 5.

In operation the stock S is normally gripped by the bushing with the force determined by the strength of the spring 25. When the pusher tube advances to feed stock forwardly the forward edge 23 of the shell 15 engages the tapered surface 22 on the bushing, tightly squeezing the bushing upon the stock and feeding the same without slipping. A positive grip is assured by making the front edge of the shell circumferentially continuous, as illustrated. On the retracting stroke the shell slides rearwardly until the edges 29 of the cut-outs 18 engage the studs 27 and pull the bushing rearwardly over the stock against the relatively light grip provided by the spring 25.

In certain machines the pusher tube is keyed to the spindle so that the pusher tube and stock rotate together while the collet is closed, and the tube drives the bushing when the collet is opened. In such machines, when the rotation of the spindle is counterclockwise as viewed from the front end, the studs 27 normally remain on the clockwise side of the cut-outs 18 and the notches 30 are formed on the counterclockwise sides of the cut-outs, as illustrated in Fig. 1. When it is desired to withdraw the bar of stock from the pusher tube the bar is grasped and rotated so as to bring the studs 27 into the notches 30, and is thereupon pulled rearwardly out of the machine. The notches 30 prevent the bushing from moving rearwardly in the shell 15 a sufficient amount to cause wedging engagement between the forward edge 23 of the shell and the tapered surface 22 of the bushing.

Preferably the notches 30 are spaced slightly to the rear of the edges 29 of the cut-outs, leaving the shoulders 31. Thus during the retracting stroke the studs 27 are seated against the edges 29 and are prevented from entering the notches 30 by the shoulders 31. In withdrawing the bar it is only necessary to slip it axially to bring the studs 27 into alignment with the notches 30.

In the form of the invention illustrated in Figs. 8 to 10 inclusive a slightly different form of bushing is shown cooperating with the shell 115, which is substantially identical with the shell 15. The bushing is formed from segments or pads 120 separated from each other by slots 121. As in the previous embodiment, the bushing is provided with a tapered surface 122 for wedging engagement with the forward edge 123 of the shell 115. In advance of the tapered surface 122 the bushing is formed with a tapered groove 124, receiving a spring 125 which, in the normal position with stock gripped in the bushing, engages the groove at its forward edge and is spaced from the groove at its rearward edge by a space 126.

Each of the segments 120 is provided at its rear end with an integral lug 127 adapted to work in one of the cut-outs 118 in the shell in the same manner as in the embodiment previously described. Fulcrum abutments 128 are provided between the pads by cutting the slots 121 forwardly into the bushing from the rear end thereof to a point spaced rearwardly from the forward edge of the spring groove 124. The slots are then completed by cutting from the forward face of the bushing with a tapered milling cutter, leaving an abutment 128 projecting from each edge of each of the segments.

In this form of the invention the bushing is arranged to be removed in a slightly different manner. Each of the lugs 127 is formed with a radial edge 140 and a beveled edge 141. When it is desired to remove the bushing from the shell the bushing is turned to bring the lugs 127 into the notches 130, and is then forcibly turned farther in the same direction so as to collapse the rear ends of the segments 120 toward each other until the lugs 127 clear the inner surface of the shell. The bushing is re-assembled into the shell in the same manner as in the embodiment previously described.

The lugs 127 may also be provided with beveled edges 142 cooperating with complementally beveled rearwardly facing edges 129 of the cut-outs 118. These edges engage to slide the bushing over the stock on the retracting stroke of the pusher and are beveled, as illustrated, so as to exert a component of the retracting force radially outward on each segment 120, thus avoiding any possibility of the lugs 127 escaping from the cut-outs 118.

Although the embodiments of the invention have been described in considerable detail, it will be understood that various rearrangements and modifications of detail may be resorted to without departing from the scope of the invention as herein claimed.

I claim:

1. A pusher comprising a shell, a bushing adapted to grip stock to be fed disposed within said shell, a wedging surface on said bushing cooperating with the forward edge of said shell to increase the grip of said bushing on the stock when said shell moves forwardly with respect to said bushing, said shell being formed with an opening through the wall thereof, a stud secured to said bushing and projecting into said opening in said shell, said stud being arranged to engage one edge of the opening in said shell to move said bushing rearwardly when said shell moves rearwardly.

2. A pusher comprising a cylindrical shell having its forward edge circumferentially continuous, a bushing adapted to grip stock to be fed disposed within said shell, a wedging surface on said bushing arranged to engage the forward edge of said shell to increase the grip of said bushing on the stock when said shell moves forwardly with respect to said bushing, said shell being formed with an opening through the wall thereof, a radially projecting stud permanently carried by said bushing and projecting into said opening in said shell, said stud being arranged to engage one edge of the opening in said shell to move said bushing rearwardly when said shell moves rearwardly.

3. In a pusher, a shell, a bushing comprising a plurality of segmental pads and a spring surrounding said pads, said bushing having one end disposed within said shell and adapted to grip stock to be fed, cooperative wedging means on said shell and bushing arranged to increase the grip of said bushing on the stock when said shell moves forwardly with respect to said bushing, said shell being formed with a plurality of openings through the wall thereof, a stud secured to each of said segmental pads and projecting into an opening in said shell, each of said studs being arranged to engage one edge of its opening in said shell to move said bushing rearwardly when said shell moves rearwardly, the other end of said bushing projecting from said shell and being arranged to be spread to free said studs from their openings and permit the removal of said bushing from said shell.

4. In a pusher, a cylindrical shell having its forward edge circumferentially continuous, a bushing comprising a plurality of segmental pads and a spring surrounding said pads, said bushing having one end disposed within said shell and adapted to grip stock to be fed, a wedging surface on said bushing arranged to engage the forward edge of said shell to increase the grip of said bushing on the stock when said shell moves forwardly with respect to said bushing, said shell being formed with a plurality of openings through the wall thereof, a stud secured to each of said segmental pads and projecting into an opening in said shell, each of said studs being arranged to engage one edge of its opening in said shell to move said bushing rearwardly when said shell moves rearwardly, the other end of said bushing projecting from the forward edge of said shell and being arranged to be spread to free said studs from their openings and permit the removal of said bushing from said shell.

5. A pusher comprising a cylindrical shell, a bushing disposed within said shell comprising a plurality of segmental pads, a spring surrounding said pads and holding the same assembled in generally cylindrical form, each of said pads having an abutment on one edge adapted to engage the edge of an adjacent pad, said spring being arranged to exert a radial compressive force on said pads on one side of said abutments so as to urge the ends of said pads toward each other on said one side of said abutments and to urge the ends of said pads away from each other on the other side of said abutments, said shell being formed with a plurality of openings and each of said pads carrying a stud located on said other side of said abutments and arranged to fit in one of said openings.

6. A pusher comprising a cylindrical shell, a bushing partially disposed within said shell having its forward end projecting from said shell, said bushing comprising a plurality of segmental pads, a spring surrounding said pads outside of said shell and holding said pads assembled, each of said pads having an abutment on one edge adapted to engage the edge of an adjacent pad, said spring being arranged to exert a radial compressive force on said pads forward of said abutments so as to urge the forward ends of said pads toward each other and the rear ends of said pads away from each other, said shell being formed with a plurality of openings and each of said pads carrying a stud located rearwardly of said abutments and arranged to fit in one of said openings.

7. A pusher comprising a cylindrical shell, a bushing disposed within said shell and arranged to grip stock to be fed comprising a plurality of segmental pads, cooperating wedging surfaces on said shell and bushing arranged to increase the grip of said bushing on the stock when said shell moves forwardly with respect to said bushing, a spring surrounding said pads and holding the same assembled in generally cylindrical form, each of said pads having an abutment on one edge adapted to engage the edge of an adjacent pad, said spring being arranged to exert a radial compressive force on said pads on one side of said abutments so as to urge the ends of said pads toward each other on said one side of said abutments and to urge the ends of said pads away from each other on the other side of said abutments, said shell being formed with a plurality of openings and each of said pads carrying a stud located on said other side of said abutments and arranged to fit in one of said openings.

8. A pusher comprising a cylindrical shell, a bushing having its rear end disposed within said shell and its front end projecting therefrom, said bushing comprising a plurality of segmental pads and a spring surrounding said pads to resiliently grip stock to be fed, cooperating wedging surfaces on said shell and bushing to increase the grip of said bushing on the stock when said shell moves forwardly with respect to said bushing, each of said pads having an abutment on one edge adapted to engage the edge of an adjacent pad, said spring being arranged to exert a radial compressive force on said pads in front of said abutments so as to urge the front ends of said pads toward each other and to urge the rear ends of said pads away from each other, said shell being formed with a plurality of openings and each of said pads carrying a stud located in rear of said abutments and arranged to fit in one of said openings.

9. A pusher comprising a cylindrical shell, a bushing having its rear end disposed within said shell and its front end projecting therefrom, said bushing comprising a plurality of segmental pads and a spring surrounding said pads outside of said shell to resiliently grip stock to be fed, a wedging surface on said bushing arranged to engage the front end of said shell to increase the grip of said bushing on the stock, each of said pads having an abutment on one edge adapted to engage the edge of an adjacent pad, said spring being arranged to exert a radial compressive force on said pads in front of said abutments so as to urge the front ends of said pads towards each other and to urge the rear ends of said pads away from each other, said shell being formed with a plurality of openings and each of said pads having a stud permanently secured thereto in rear of said abutments and arranged to fit in one of said openings, the front ends of said pads being arranged to be spread to free said studs from the openings in said shell to permit the removal of said bushing.

10. A pusher comprising a shell, a bushing adapted to grip stock to be fed disposed within said shell, cooperating wedging means on said shell and bushing arranged to increase the grip of said bushing on the stock when said shell moves forwardly with respect to said bushing, said shell being formed with an opening through the wall thereof, a stud permanently carried by said bushing and projecting into said opening in said shell, said stud having a beveled edge arranged to engage a correspondingly beveled edge in the opening in said shell to move said bushing rearwardly when said shell moves rearwardly, and said beveled edges being arranged to exert a component of the retracting force of said shell radially outward on said stud.

11. In a pusher, a shell, a bushing comprising a plurality of segmental pads and a spring surrounding said pads, said bushing having one end disposed within said shell and adapted to grip stock to be fed, said shell being formed with a plurality of openings through the wall thereof, a stud secured to each of said segmental pads and projecting into an opening in said shell, each of said studs having a beveled edge arranged to engage a correspondingly beveled edge of its opening in said shell, to move said bushing rearwardly when said shell moves rearwardly, said beveled edges being arranged to apply a component of the force of said shell to spread the inner ends of said pads radially outward.

12. A pusher comprising a cylindrical shell, a bushing having its rear end disposed within said shell and its front end projecting therefrom, said bushing comprising a plurality of segmental pads and a spring surrounding said pads to resiliently grip stock to be fed, cooperating wedging surfaces on said shell and bushing to increase the grip of said bushing on the stock when said shell moves forwardly with respect to said bushing, each of said pads having an abutment on one edge adapted to engage the edge of an adjacent pad, said spring being arranged to exert a radial compressive force on said pads in front of said abutments so as to urge the front ends of said pads toward each other and to urge the rear ends of said pads away from each other, said shell being formed with a plurality of openings and each of said pads carrying a stud located in rear of said abutments and arranged to fit in one of said openings, the forward edge of each of said studs being undercut and adapted to engage an edge of its opening so that rearward movement of said shell holds the rear ends of said pads against inward movement.

13. A pusher comprising a shell, a bushing adapted to grip stock to be fed disposed within said shell, cooperating wedging means on said shell and bushing arranged to increase the grip of said bushing on the stock when said shell moves forwardly with respect to said bushing, said shell being formed with an opening through the wall thereof, a stud permanently carried by said bushing rearwardly of said wedging means and projecting into said opening in said shell, said stud being arranged to engage one edge of the opening in said shell to move said bushing rearwardly when said shell moves rearwardly.

14. A pusher comprising a shell, a bushing adapted to grip stock to be fed disposed within said shell, a wedging surface on said bushing cooperating with the forward edge of said shell to increase the grip of said bushing on the stock when said shell moves forwardly with respect to said bushing, said shell being formed with an opening through the wall thereof, a stud permanently carried by said bushing and projecting into said opening in said shell, said stud being arranged to engage one edge of the opening in said shell to move said bushing rearwardly when said shell moves rearwardly, said bushing being constructed to resiliently contract upon the stock to be fed adjacent its forward end and the portion of said bushing carrying said stud being constructed to resiliently urge said stud radially outward into said opening.

15. A pusher comprising a cylindrical shell having its forward edge circumferentially continuous, a bushing adapted to grip stock to be fed disposed within said shell, a wedging surface on said bushing arranged to engage the forward edge of said shell to increase the grip of said bushing on the stock when said shell moves forwardly with respect to said bushing, said shell being formed with an opening through the wall thereof, a radially projecting stud permanently carried by said bushing and projecting into said opening in said shell, said stud being arranged to engage one edge of the opening in said shell to move said bushing rearwardly when said shell moves rearwardly, said bushing being constructed to resiliently contract upon the stock to be fed adjacent its forward end and the portion of said bushing carrying said stud being constructed to resiliently urge said stud radially outward into said opening.

16. A pusher comprising a shell, a bushing adapted to grip stock to be fed disposed within said shell, a wedging surface on said bushing cooperating with the forward edge of said shell to increase the grip of said bushing on the stock when said shell moves forwardly with respect to said bushing, said shell being formed with an opening through the wall thereof, a stud integral with a portion of said bushing and disposed rearwardly of said wedging surface and projecting into said opening, said stud being arranged to engage one edge of the opening in said shell to move said bushing rearwardly when said shell moves rearwardly, said bushing being constructed to resiliently contract upon the stock to be fed adjacent its forward end and constructed to urge said stud resiliently outward into said opening.

STODDARD B. MARTIN.